United States Patent [19]
Taillon et al.

[11] Patent Number: 5,791,924
[45] Date of Patent: *Aug. 11, 1998

[54] TWO PIECE ELECTRICAL AND FLUIDIC CONNECTOR AND INSTALLATION METHOD THEREFORE

[75] Inventors: James Kenneth Taillon, High Ridge; Frank Richard Reidelberger, III, Chesterfield, both of Mo.

[73] Assignee: Mechanical Dynamics and Analysis, Inc., Scotia, N.Y.

[*] Notice: The term of this patent shall not extend beyond the expiration date of Pat. No. 5,573,414.

[21] Appl. No.: 828,978

[22] Filed: Mar. 31, 1997

Related U.S. Application Data

[63] Continuation of Ser. No. 685,106, Jul. 23, 1996, Pat. No. 5,616,040, which is a continuation of Ser. No. 405,225, Mar. 16, 1995, Pat. No. 5,573,414.

[51] Int. Cl.$^6$ ............................................. H01R 4/60
[52] U.S. Cl. ............................................. 439/191
[58] Field of Search ........................... 439/191, 192, 439/193, 194, 195; 29/596

[56] References Cited

U.S. PATENT DOCUMENTS

| | | | |
|---|---|---|---|
| 2,178,931 | 11/1939 | Crites et al. | 439/191 |
| 2,473,879 | 6/1949 | Guiarnaschelli | 285/74 |
| 3,006,064 | 10/1961 | Watson | 29/401 |
| 3,006,065 | 10/1961 | Watson | 29/401 |
| 3,085,219 | 4/1963 | Bass, Jr. | 439/195 |
| 3,551,995 | 1/1971 | Marechal | 29/471.3 |
| 4,012,092 | 3/1977 | Godbey | 439/191 |
| 4,087,906 | 5/1978 | Cobaugh et al. | 29/630 D |
| 4,616,894 | 10/1986 | Baker | 439/192 |
| 4,633,554 | 1/1987 | Clark et al. | 29/156.4 R |
| 4,650,110 | 3/1987 | Cheng | 228/242 |
| 4,652,064 | 3/1987 | Cetrone | 439/191 |
| 4,700,743 | 10/1987 | L'Henaff et al. | 439/191 |
| 4,799,544 | 1/1989 | Curlett | 439/191 |
| 4,830,266 | 5/1989 | Adams, Jr. | 228/231 |
| 4,913,657 | 4/1990 | Naito et al. | 439/192 |
| 5,103,552 | 4/1992 | Fogarty et al. | 29/596 |
| 5,197,895 | 3/1993 | Stupecky | 439/194 |

*Primary Examiner*—Gary F. Paumen
*Assistant Examiner*—Barry M. L. Standig
*Attorney, Agent, or Firm*—Heslin & Rothenberg, P.C.

[57] ABSTRACT

In water cooled electric generators, an electrical and fluidic connector connects a stator bar to an electrical bus and to a water source. The connector comprises two pieces, a clip and a sleeve. During installation, the sleeve is brazed to the stator bar in a fluid tight manner, and the clip is then brazed to the sleeve. Fluidic connection from the generator's water source to the stator bar is provided by a hose attached to a fluid port on the clip. Connection to the electrical bus of the generator is provided by copper leaves and/or copper piping brazed onto the clip. The clip and the sleeve are both formed from copper to form an electrical connection between the copper leaves and/or copper piping and the stator bar. The connector may be further used to replace a defective electrical and fluidic connector that terminates a stator bar in a water cooled electric generator.

22 Claims, 11 Drawing Sheets

5,791,924

1

TWO PIECE ELECTRICAL AND FLUIDIC CONNECTOR AND INSTALLATION METHOD THEREFORE

This application is a continuation of application Ser. No. 08/685,106 filed Jul. 23, 1996 which application is now U.S. Pat. No. 5,616,040 which is a continuation of application Ser. No. 08/405,225, filed Mar. 16, 1995, which application is now issued U.S. Pat. No. 5,573,414.

TECHNICAL FIELD

The present invention relates in general to electrical and fluidic connectors. More specifically, the present invention relates to an electrical and fluidic connector for use in terminating a stator bar in a large electric generator and an installation method therefore.

BACKGROUND OF THE INVENTION

Large electric machines present unique engineering challenges. For example, the operational cooling of electrical generators used in large fossil and nuclear power generation plants is a particularly interesting problem. Of the many parts requiring cooling in large electric generators, cooling the stator bars is of significant importance. The stator bars carry most of the electrical power generated and therefore heat up very quickly due to, for example, general ohmic losses, $I^2R$ losses and eddy current losses. For many years, stator bars have been water cooled by circulating ultra-pure deionized water therethrough. This water travels out of the generators to cooling arrays where heat is removed, and is then recirculated to the generators in a closed loop system. One example of such a water cooled generator is a General Electric Corp. model 4A4W2 electric generator.

Stator bars conventionally comprise multiple strands. These strands are generally rectangular and are composed of an electrically conductive material such as, for example, copper. They are grouped together to form rectangular stator bars. The strands are individually insulated from each other within a stator bar to reduce eddy currents and associated losses. However, the strands of the stator bars are typically brazed together at their ends to facilitate electrical connection and liquid seal therebetween. To provide cooling, at least several strands within the stator bar are hollowed such that cooling water may pass therethrough.

Since the stator bars carry most of the electrical power in generators, electrical connection thereto is necessary to extract electrical power therefrom. Further, a facility for introducing and removing cooling water from each stator bar is necessary. The traditional device for simultaneously providing these electrical and fluidic functions is a single piece electrical and fluidic connector shown, for example, in FIG. 1 as connector 11. This single piece connector provides: 1) electrical connection from a stator bar 19, through its own copper body (i.e., connector 11) and through a set of copper leaves 17 (and/or copper piping in, for example, a series loop system) to an electrical bus in the generator; and 2) fluidic connection from the water carrying strands in stator bar 19, through an inner chamber to a fluidic connector 15 where the water is passed to a hose for transfer.

Water cooling of stator bars is not without problems, however. One particularly serious problem is water leakage. Due to the high volume of water passing through the stator bars, even a small leak can lead to a large volume of water entering areas of the generator in which water is undesirable. This can eventually lead to a catastrophic failure of the generator comprising, for example, a ground fault.

2

Furthermore, leaks are very often hard to find because the stator bars are buried within large amounts of insulation deep within the electrical generator.

The conventional electrical and fluidic connector 11 discussed hereinabove has a propensity towards water leakage. Further, once a single water leak occurs, operational experience has shown a tendency toward the development of additional water leaks which are known to occur at several regions associated with the conventional connector 11. As one example, water leakage may occur at the interface between the stator bar 19 and the connector 11. This is due to the structure of the clip and associated assembly method. To explain, during factory assembly of the generator, the individual strands composing the stator bar are inserted into an opening 20 within the connector 11. The strands are then brazed to the connector 11 by a worker who accesses the internal brazed areas through a small window in the connector (the window is shown covered by plate 13). This is a difficult process as space within the connector 11 and the access window is limited. In fact, the window is so small that a worker will typically rely on dental mirrors and other ad-hoc brazing means to view the brazed connection being created. Thus, poor brazed connections that leak water may result. After brazing of the connector to the stator bar is completed, the window is closed by brazing a copper plate 13 thereover. This window and associated plate 13 provide yet another opportunity for water leakage. Thus, inherent in the conventional single piece electrical and fluidic connector are multiple connections that are prone to damaging water leakage.

The conventional electrical and fluidic connector and associated assembly techniques have a further disadvantage. Specifically, there is no way to easily replace a faulty connector while the associated stator bar is still within the generator. Therefore, a complete disassembly of the generator is conventionally recommended to replace a leaky connector. Of course, this is very expensive and highly undesirable.

The present invention is directed toward providing solutions for the above-noted problems.

DISCLOSURE OF THE INVENTION

Briefly described, in a first aspect, the present invention comprises an electrical and fluidic connector for connecting an electro-fluidic conductor to a fluidic conductor and an electrical conductor. Specifically, the electrical and fluidic connector includes a first member that is electrically conductive and is configured to encircle and electrically attach to an end portion of the electro-fluidic conductor. Further, the electrical and fluidic connector includes a second member that is electrically conductive and is configured for matable engagement to the first member. The second member includes a fluid port for facilitating connection to the fluidic conductor and is configured for electrical connection to the electrical conductor.

Furthermore, the first member and the second member define a hollow inner chamber when they are in matable engagement. In particular, the hollow inner chamber comprises a fluid tight chamber such that fluid may pass through the hollow inner chamber between the electro-fluidic conductor and the fluid port of the second member. Also, the first member and the second member themselves provide the electrical connection between the electro-fluidic conductor and the electrical conductor when it is connected to the second member.

As an enhancement, the electro-fluidic conductor may comprise a stator bar that has multiple electrically conducting strands. At least one of the electrically conducting strands may also be adapted to conduct fluid. In such a case, the first member is configured to electrically attach to an end portion of the plurality of electrically conducting strands.

In an other embodiment, a method is disclosed for coupling the electrical and fluidic connector to the electro-fluidic conductor. The method comprises securing the first member to the electro-fluidic conductor such that the first member encircles an end portion of the electro-fluidic conductor, forms a fluid tight seal thereto and electrically connects therewith. The method further includes matably connecting the first member to the second member to form the above-described hollow inner chamber.

As an enhancement, the method may include removing a defective electrical and fluidic connector from the electro-fluidic conductor before connecting the first member thereto. Further, the method may include verifying the fluid tight seal that connects the first member and the electro-fluidic conductor.

The techniques of the present invention have numerous advantages and features attributable thereto. Specifically, the techniques disclosed herein facilitate the replacement of a defective electrical and fluidic connector for a stator bar while the stator bar is still within the electric generator. This advancement results in a cost savings as the steps required to physically remove stator bars are expensive compared to an "in machine" repair. As a further advantage, the connector of the present invention provides more fluid tight seals that are more easily verifiable. Moreover, repair of the connector is easily facilitated using the techniques disclosed herein. Thus, the techniques of the present invention improve the reliability of, and repair process associated with, the electrical and fluidic connectors that terminate water cooled stator bars in large electric machines.

BRIEF DESCRIPTION OF THE DRAWINGS

The subject matter that is regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

BEST MODE FOR CARRYING OUT THE INVENTION

Figure 2:
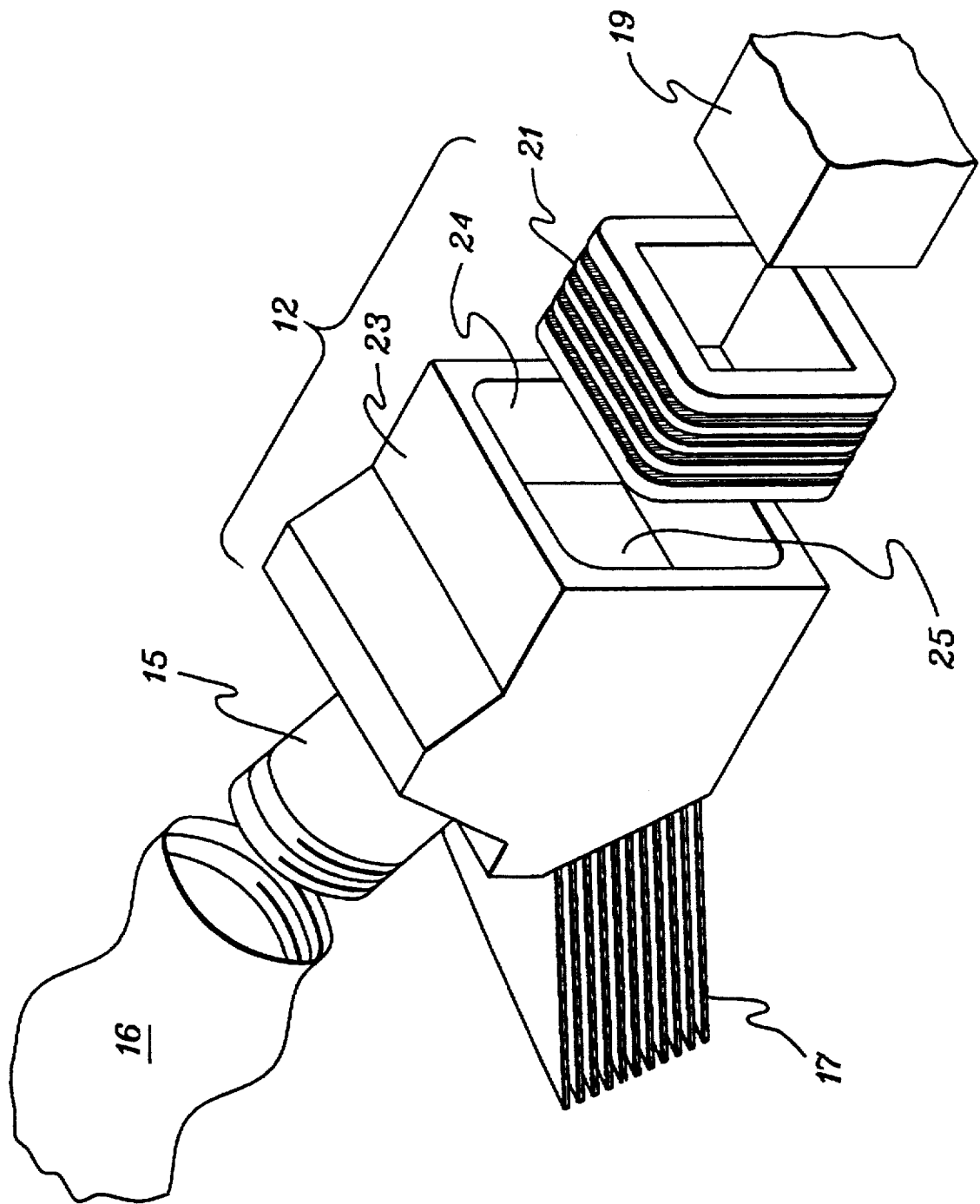
FIG. 2 is a perspective view of one embodiment of the electrical and fluidic connector of the present invention in combination with a stator bar and electrical connection leaves.

Shown in FIG. 2 is a perspective view of one embodiment of an unassembled electrical and fluidic connector 12 of the present invention in combination with stator bar 19 and electrical connection leaves 17. The connector 12 is composed of two members, a first member referred to herein as a "sleeve" 21 and a second member referred to herein as a "clip" 23. The sleeve 21 is designed to tightly encircle the end of stator bar 19. Specifically, when the end of the stator bar has its insulation removed to expose the strands therewithin that compose the stator bar, the sleeve 21 may be brazed directly thereto. This brazed connection forms an electrically conductive, mechanically rigid and fluid tight connection between the sleeve 21 and the stator bar 19.

Figure 1:
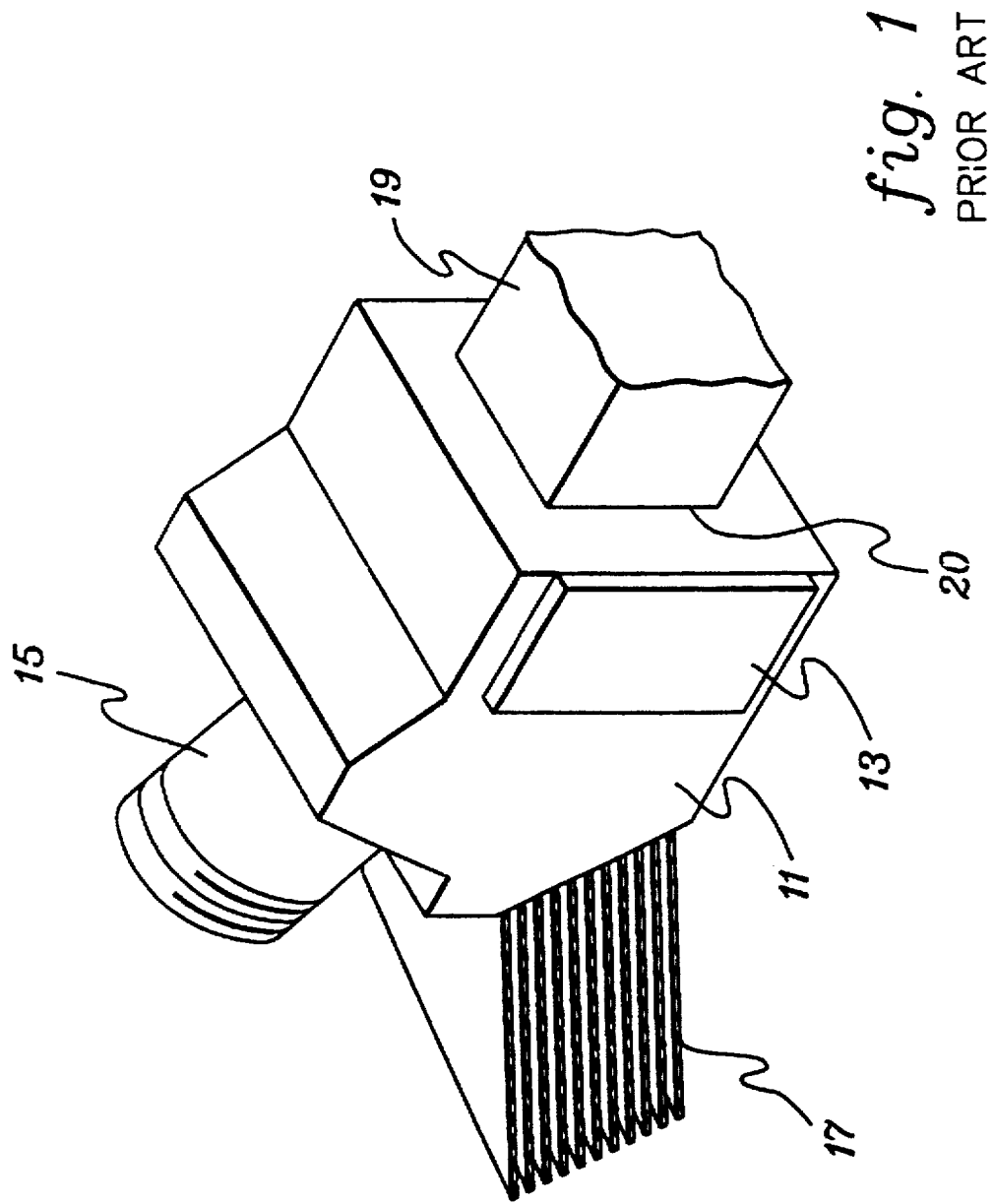
FIG. 1 is a perspective view of a conventional electrical and fluidic connector used to terminate a stator bar.

The clip 23 of the electrical and fluidic connector 12 is designed to matably connect to sleeve 21. In this regard, clip 23 has an opening 24 therewithin that is precisely machined to receive clip 21. Clip 23 also has a hollow inner chamber 25 for passing water between the fluid conducting strands of stator bar 19 and fluid port 15. The fluid port 15 is adapted to receive a conventional hose 16 of the type used to mate to the fluid port of the conventional connector 11 (FIG. 1) for facilitating replacement thereof. The clip 23 (FIG. 2) has attached copper leaves 17 (and/or copper piping) that facilitate electrical connection to an electrical bus in the generator in a manner apparent to one of ordinary skill in the art.

Preferably, both the clip 23 and the sleeve 21 of electrical and fluidic connector 12 are composed of machined forged copper. This has many advantages. First, because the clip 23 and sleeve 21 are conductive, they themselves form the electrical connection between the stator bar 19 and the electrical leaves 17. Further, machined parts are highly accurate in size so that a fluid-tight fit is ensured. Additionally, the forged copper that is machined into clip 23 and sleeve 21 has low porosity such that leakage therethrough is reduced. To contrast, the conventional single piece electrical and fluidic connector is typically fabricated by a copper casting process which produces a copper connector with higher porosity than a machined part. Water leakage through the conventional connector itself is therefore possible.

Figure 3:
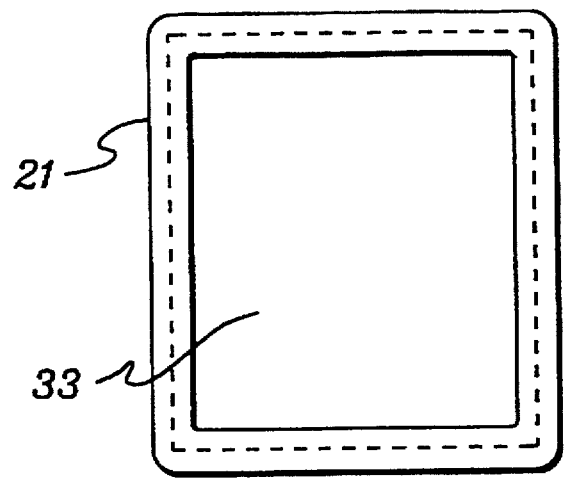
FIGS. 3 and 4 are a front view and a side view, respectively, of the sleeve portion of an electrical and fluidic connector of FIG. 2 in conformance with one embodiment of the present invention.
Figure 4:
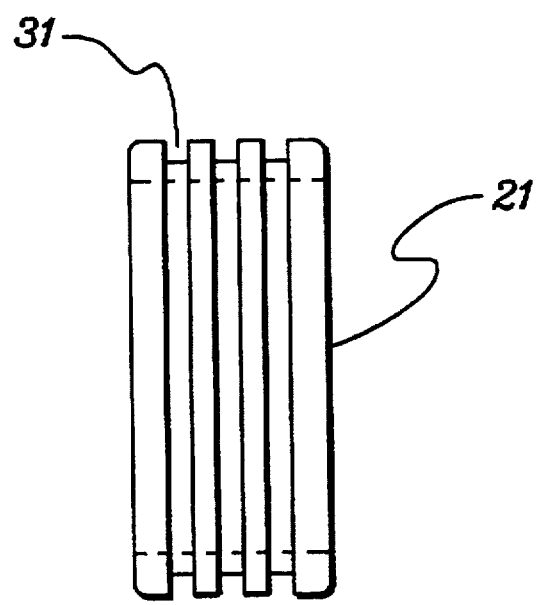
Figure 14A:
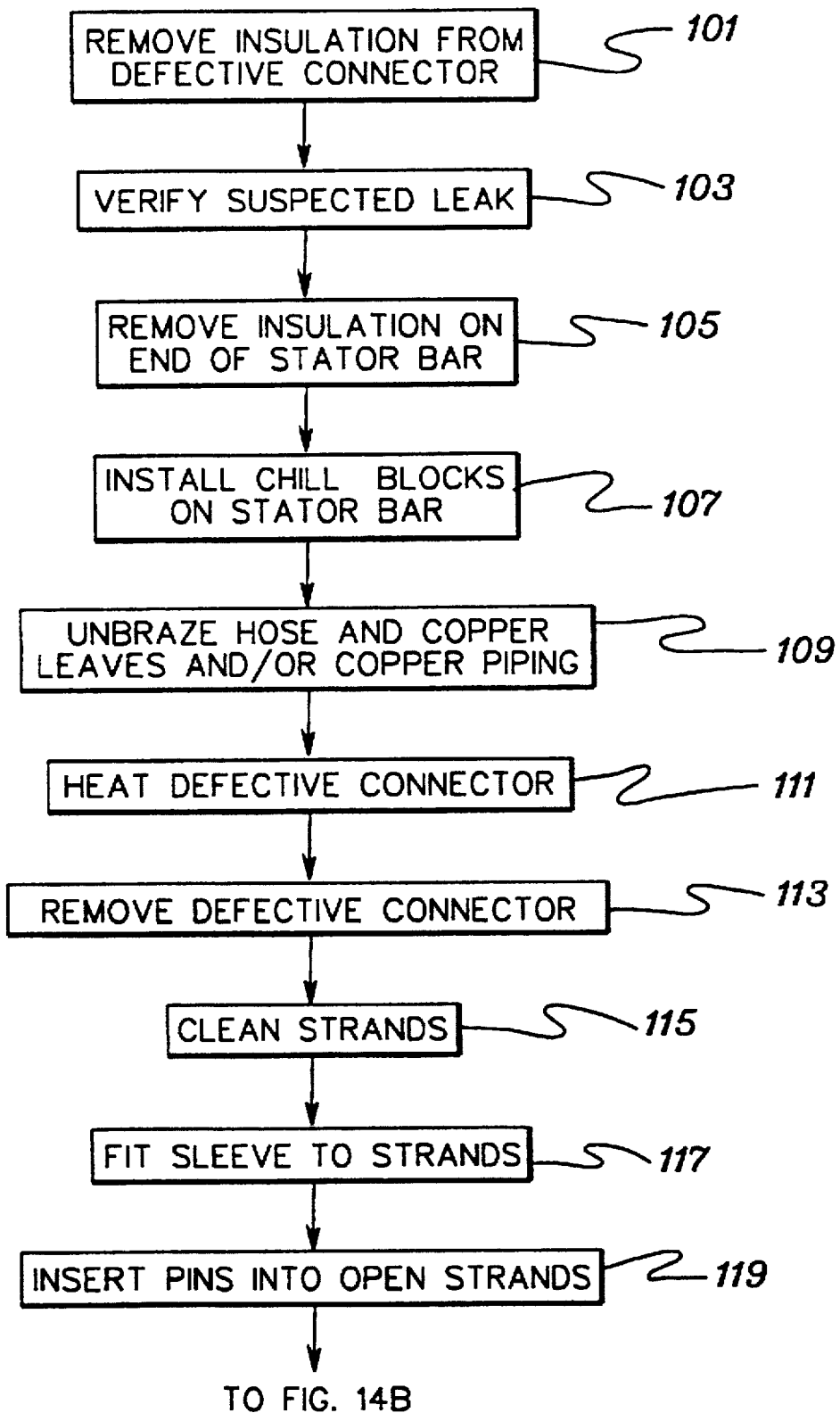
FIGS. 14A–14B are flow diagrams of a method for providing an electrical and fluidic connector on a stator bar in accordance with an embodiment of the present invention.
Figure 14B:
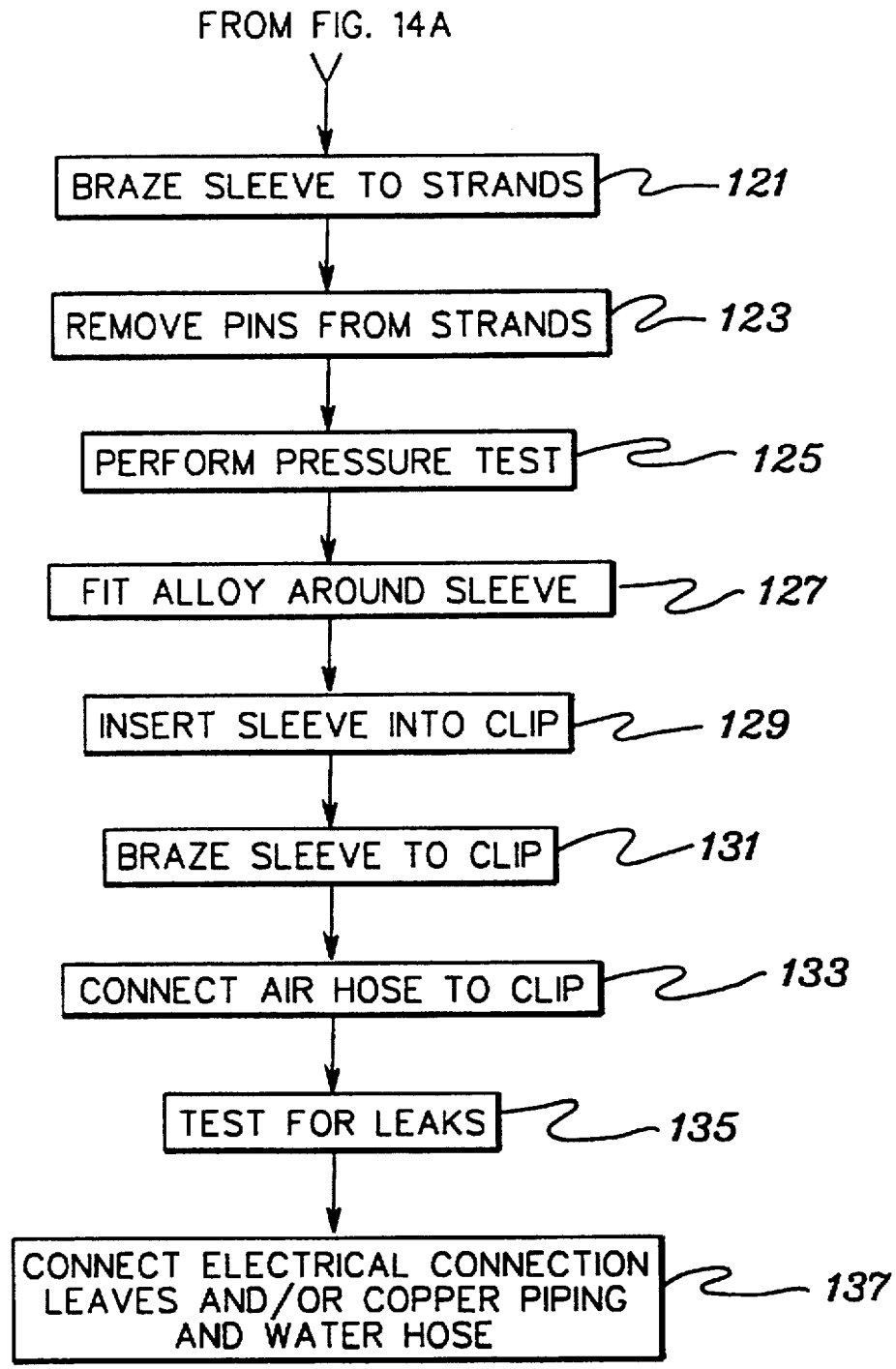

Further detail regarding the sleeve 21 is shown in FIGS. 3 and 4. In particular, sleeve 21 has an opening 33 sized to fit over the end of a stator bar (although some clearance is added for accommodating brazing alloy). Furthermore, the outside surface of the sleeve contains multiple circumferential grooves 31 therein. These grooves are configured to receive brazing alloy that is used to braze the sleeve 21 to a clip during assembly as described in further detail hereinbelow with regard to the method of FIGS. 14A–14B. The multiple grooves are each filled with a brazing alloy such that when inserted into the clip and heated, the brazing alloy extensively contacts areas on both the sleeve and the clip such that a highly secure connection therebetween is formed.

Figure 7:
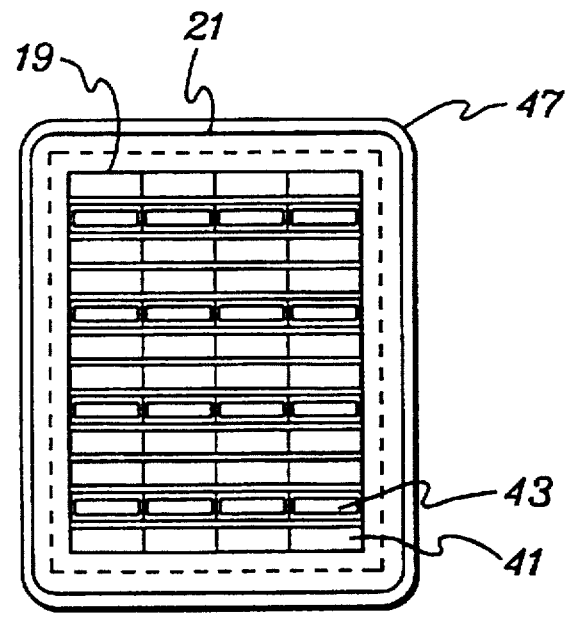
FIGS. 7 and 8 are a front view and a side view, respectively, of the sleeve and stator bar assembly of FIG. 6, pursuant to an embodiment of the present invention.

As an example, the front view of FIG. 7 shows the different types of strands within the stator bar as inserted into a sleeve 21. Both the hollow fluid conducting strands 43 and the solid strands 41 are shown. Upon initial factory assembly, the ends of the strands of the stator bars are brazed together such that electrical connection therebetween is provided. Therefore, when inserted into, and brazed to, sleeve 21, the sleeve is electrically connected to each strand within the stator bar.

Figure 5:
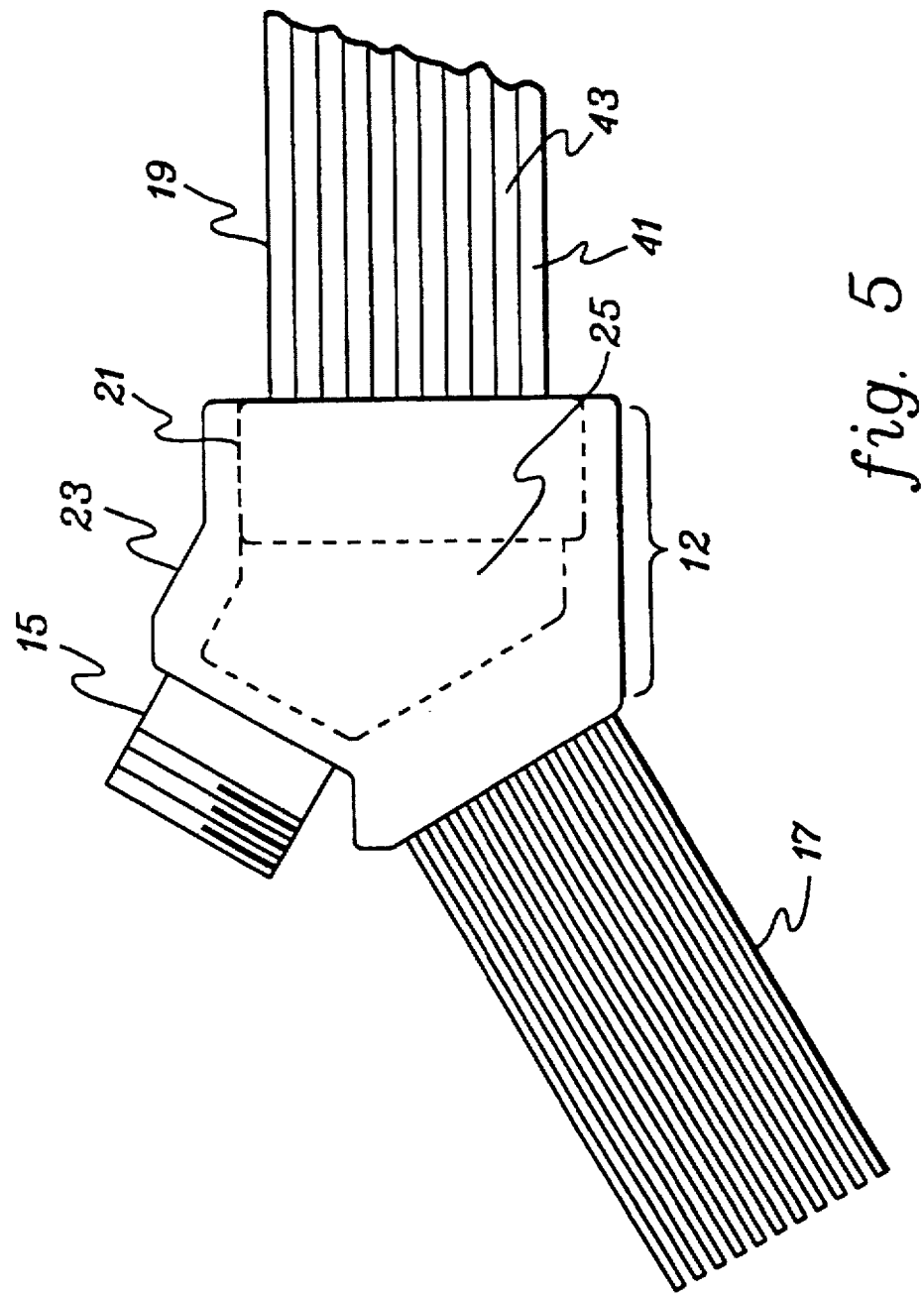
FIG. 5 is a side view of the electrical and fluidic connector of FIG. 2 after assembly, according to an embodiment of the present invention.

Once assembled (FIG. 5), the completed connector 12 provides an electrical connection between the brazed together strands of stator bar 19 (e.g., fluidic strand 43 and non-fluidic strand 41, see FIG. 7) and electrical leaves 17 (and/or copper piping). Again, the electrically conductive nature of clip 23 and sleeve 21 themselves comprises the electrical connection. Further, the completed connector 12 passes fluid between the fluidic strands (e.g., fluidic strand 43), hollow inner chamber 25 and fluid port 15. Cooling water may flow through the connector in either direction depending upon which end of the stator bar the connector is installed on. For example, if cooling water were to flow from a first end of a stator bar to a second end, the water would enter the fluid port of the connector on the first end, traverse the connector, enter the stator bar and pass therethrough, enter the connector on the second end of the stator bar and pass out of the fluid port on the connector on the second end of the stator bar. Of course, fluid flow could be reversed. Thus, the connector 12 of the present invention facilitates connection from an electro-fluidic conductor (e.g., stator bar 19) to a separate electrical conductor (e.g., electrical leaves 17 and/or copper piping) and to a separate fluidic conductor (e.g., a hose 16 attached to fluid port 15—see FIG. 2).

The fluid flow may have many configurations in a generator with water cooled stator bars including, for example, a configuration wherein water enters each stator bar from a first fluidic header to which each fluid port hose is attached. The water exits from the fluid port of the connector on the opposite end of each stator bar where it is passed to a second fluidic header that passes the water to external cooling arrays where it is cooled and thereafter recycled. This configuration is referred to herein as a "one pass" configuration because the cooling water passes through one stator bar in a single direction. In another configuration referred to herein as a "two pass" configuration, cooling water exiting one stator bar via a fluid port of a terminating connector is routed to the fluid port of a second stator bar for passage through the second stator bar. Upon exiting the fluid port of a connector on a second end of the second stator bar the water is passed to cooling arrays and then recycled. One type of "two pass" configuration is known as a "series loop" configuration. In such a machine, a single copper pipe may be used to carry both fluid and electrical current from one stator bar to a next stator bar.

Figure 9:
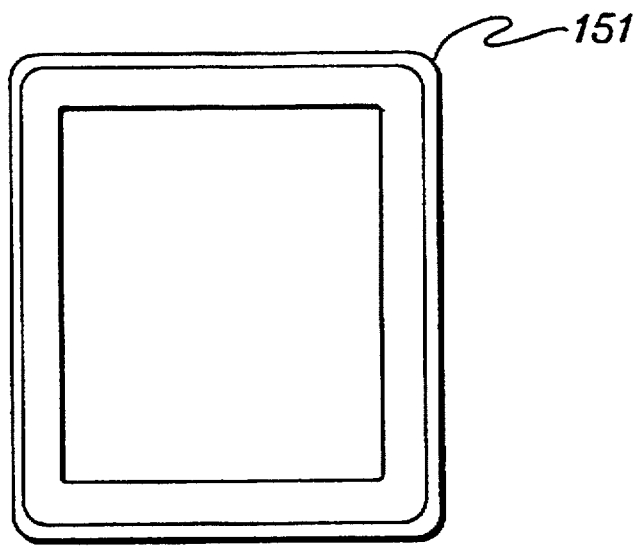
FIGS. 9 and 10 are a front view and a side view, respectively, of an alternate embodiment of the sleeve portion of the electrical and fluidic connector of the present invention.
Figure 10:
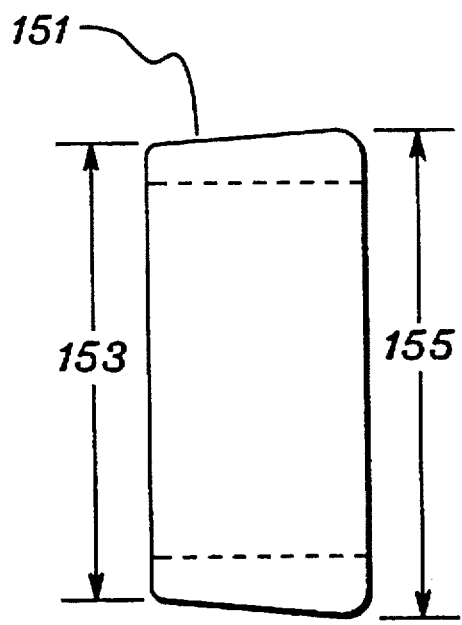
Figure 11:
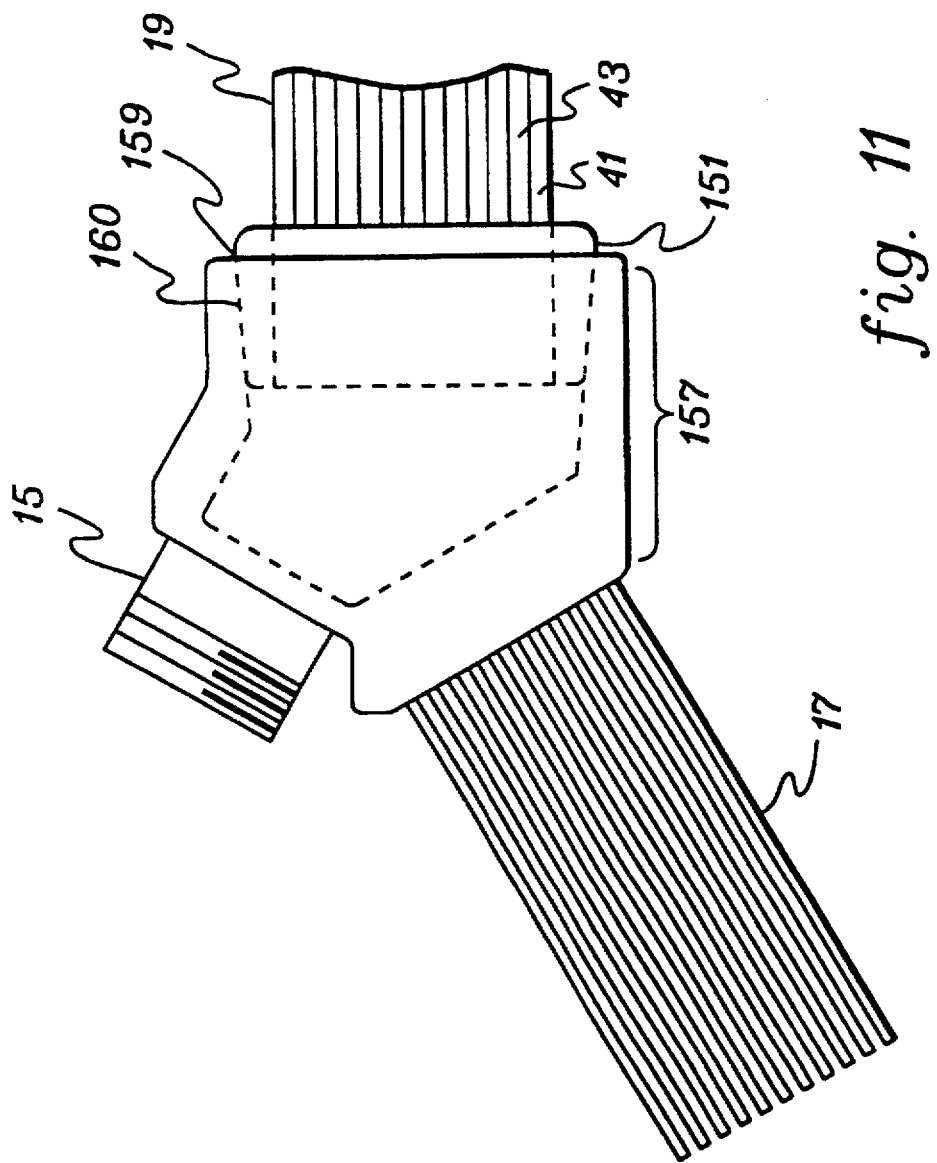
FIG. 11 is a side view of an assembled electrical and fluidic connector that used the sleeve of FIGS. 9 and 10 according to one embodiment of the present invention.

In an alternate embodiment of the present invention, a tapered sleeve 151 (FIGS. 9–10) is used. This tapered sleeve has a solid outer surface which tapers from a first diameter 155 to a second, smaller diameter 153. The taper is used to provide a tight connection when matably engaged with a corresponding clip. Specifically, sleeve 159 matably engages with clip 157 (FIG. 11) which has a tapered opening 160 that corresponds to the taper of sleeve 159. The clip 157 facilitates the attachment of copper leaves 17 and has a fluid port 15, while sleeve 159 surrounds an end portion of stator bar 19 that includes strands 41 and 43.

In another embodiment of the present invention, the electrical and fluidic connector of the present invention may by designed to function in a "series loop" type configuration.

Figure 12:
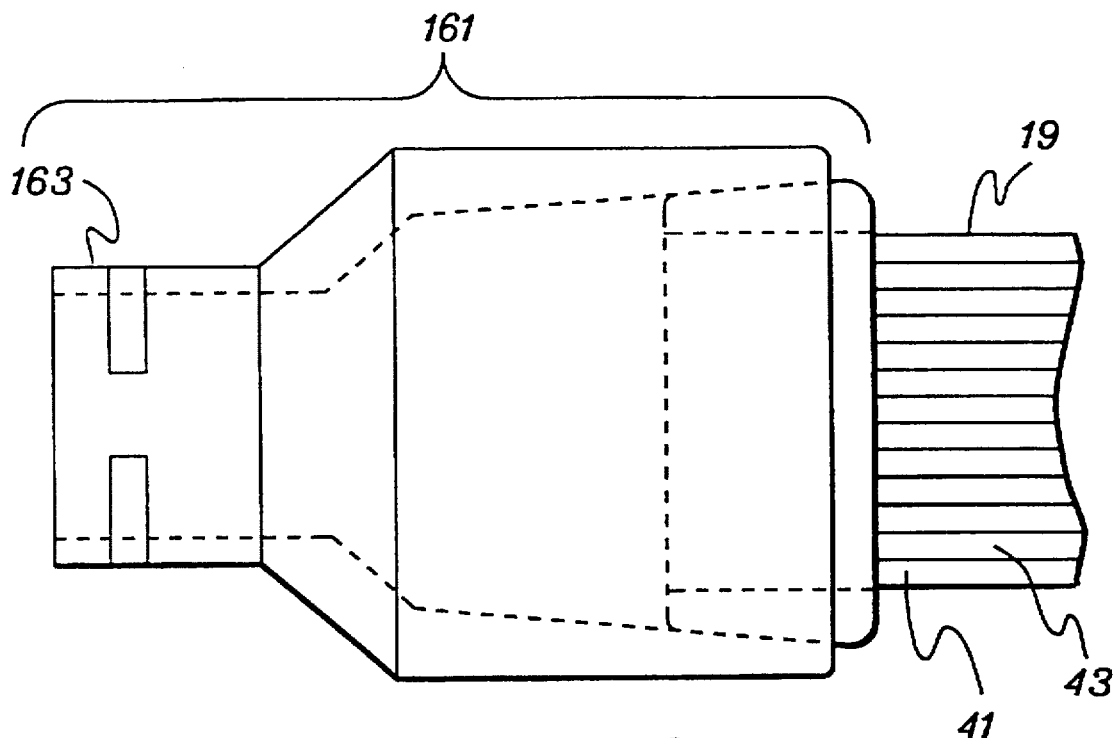
FIGS. 12 and 13 are a front view and top view, respectively, of an assembled electrical and fluidic connector that attaches to copper piping according to an embodiment of the present invention.
Figure 13:
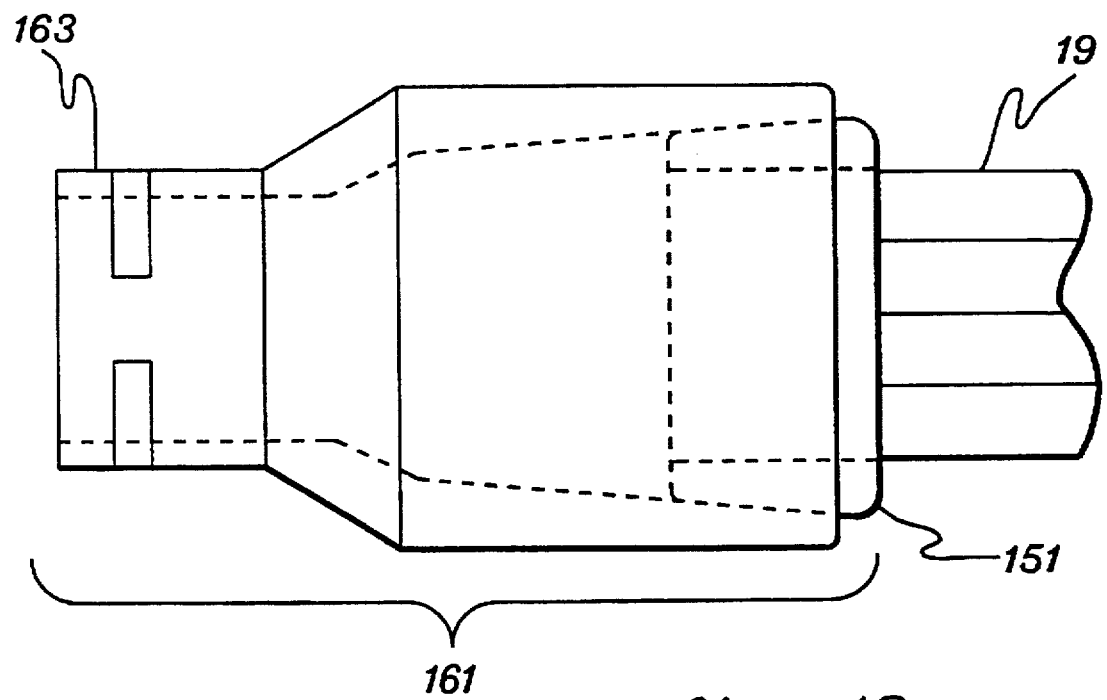

In such a case, the clip 161 (FIGS. 12–13) has an end portion 163 that is adapted to matably engage with copper piping. In effect, end portion 163 is both a fluid port and is adapted for electrical connection to clip 161. Again, the copper piping routes both cooling water and electrical current to a succeeding electrical and fluidic connector and attached stator bar. In the example shown, the tapered type sleeve is shown, although the grooved type sleeve of, for example, FIG. 3 could also be used.

The techniques of the present invention provide for the removal of a defective conventional connector 11 (FIG. 1) and replacement thereof with the new two-piece connector 12 (FIG. 2) disclosed herein. The steps for performing this process are described below with respect to the flow diagram of FIGS. 9A–9B.

Once a water leak has been detected, and a suspect connector has been identified, insulation surrounding the connector is removed (101—FIG. 9A). Specifically, the stator bars and connectors are buried deep within large amounts of bulk insulation such that accessing the suspect connector and associated stator bar requires the removal of the bulk insulation.

After the bulk insulation is removed, the suspected leak is verified using trace gas testing by steps that will be apparent to one of ordinary skill in the art (103). As an example, a trace gas test may be performed by the following steps:

a) Drain the water in the stator cooling water system and in the stator with at least 20 pounds of $H^2$ pressure in the generator. $H^2$ pressure should remain in the generator during water drainage so that water does not enter the leak by capillary action and seal the leak.

b) After the gas is purged from the generator and replaced with air, blank off the stator winding at the top of the generator.

c) "Burp" the remaining water from the winding by pressurizing the winding with high quality (instrument) air, and releasing it rapidly with a fast action valve.

d) Bottle up the stator and pull vacuum.

e) Maintain the vacuum for at least 24 hours or until the generator has been disassembled enough to provide access to inspect the end turns, water header and hoses.

f) While the unit is being disassembled, review the most recent set of stator Resistance Temperature Detector ("RTD") and Thermocouple ("TC") temperatures. Identify the highest temperature coils as leak candidates.

g) Break vacuum on the windings with $SF^6$ (sulfur hexaflouride) gas and pressurize winding to 10 PSI with the gas.

h) Probe windings with a halogen leak detector. Use two detectors to verify initial findings.

i) If both detectors indicate a leak, verify the location with a liquid soap bubble test.

j) Continue checking the remaining winding for the possibility of more than one leak.

k) If no leaks are found with the $SF^6$ at 10 psi, raise the pressure of the $SF^6$ gas to 30 pounds. Repeat steps h–j above.

l) If the 30 pounds leak check of the winding is passed, prior to performing reassembly, the $SF^6$ should be released down to atmospheric pressure and the sealed winding pressurized to 100 PSI with instrument air for a 24 hour pressure decay test.

The suspected leaky clip is thereby verified as defective and requiring replacement.

At this stage in the process, a portion of a mica tape based insulation on the stator bar is removed (i.e., cut back) from the area where the stator bar meets the defective connector (105). This exposes the braze which joins the stator bar to the defective connector such that removal of the defective connector is facilitated. Thereafter, chill blocks (107) are installed on the stator bar near the defective connector to remove excess heat from the stator bar during the connector removal process. This is because the heat generated during connector removal could damage the stator bar and/or insulation surrounding it. The chill blocks themselves are then tested for water leaks and activated. After confirming the operation of the chill blocks, the water hose and copper leaves (and/or copper piping) are unbrazed from the defective connector using a torch brazing process to facilitate removal of the defective connector itself (109).

More specifically, to remove the copper leaves and/or copper piping for the liquid connections, a single-tipped torch brazing process may be used. Fuel for the torch comprises oxygen and propane. The copper leaves are unbrazed one at a time, then separated and rolled back using pliers. Since there are multiple leaves, it is necessary to roll back each leaf tightly against the "water box" to allow enough room for all the leaves to be unbrazed. Care must be taken not to crack the leaves during the unbrazing procedure.

For liquid cooled "series loop" machines, the interconnecting copper piping must be removed. Care should be taken in removing the tubing as to not damage the adjacent series loop connections. A double-tipped torch, using propane and oxygen fuel, normally works best for this procedure.

An induction brazing station having custom made coils surrounding the defective connector is next set up. These coils are water cooled, and are appropriately tested for leakage before use. The brazing station is activated and the defective connector is heated (111) until it achieves a cherry red color (approximately 900–1100 degrees Fahrenheit). Temperature may be monitored using, for example, a digital thermometer. Once the desired temperature is reached, pliers are used to clamp each side of the defective connector and slowly remove it from the stator bar (113). Upon removal, the power to the induction heater is discontinued and the chill blocks are checked to ensure that they are properly cooling the stator bar. If unusually high temperatures were required to remove the defective connector, then cool air may be blown through the stator bar from the opposite end to enhance cooling.

After cooling to ambient temperature, the exposed ends of the strands that compose the stator bar may now be polished (115) such that excess brazing alloy is removed therefrom. This may be performed by many polishing processes such as by using a polishing wheel manufactured by the 3M Corporation of St. Paul, Minn., under the brand name Scotchbrite.

The exposed strands of the stator bar are ready for fitting into the sleeve of the connector of the present invention (117). Accordingly, the strands are wrapped with a brazing alloy ribbon (sometimes referred to herein as a "strand" brazing alloy) such that they fit tightly into the sleeve. As an example, an American Welding Society ("AWS") B-CUP 5 designation brazing alloy ribbon may be used. The brazing alloy ribbon should be applied to the strands such that there are no gaps in the fit to the sleeve. After the sleeve is fit, stainless steel pins that are sized to tightly fit into the open ends of the fluid carrying strands are lightly tapped into each fluid conducting strand (119) to prevent the brazing alloy from flowing into the fluid openings of the strands and clogging them during brazing.

The induction brazing station is again set up, however, this time the coils used are custom designed to fit around the sleeve of the connector of the present invention (coils for either the tapered sleeve or grooved sleeve are used). Again, the system is checked for water leaks prior to use. The induction brazing station is activated (121—FIG. 14B) and the sleeve is heated until alloy begins to flow (approximately 1200 degrees Fahrenheit). Stick brazing alloy of similar composition to the ribbon brazing alloy is added to the front and back of the sleeve during brazing to ensure a good connection. Furthermore, brazing alloy is applied to the face of the strands to ensure that they are properly brazed together. As a general note, care should be taken to avoid getting brazing alloy on the outside of the sleeve such that the precise fit of the sleeve into the clip is not affected. Advantageously, access to both the front and back of the sleeve during brazing allows adequate brazing alloy to be introduced in appropriate locations.

To continue, after sufficient alloy has been applied, the brazing station is deactivated and the sleeve/strands assembly is allowed to cool to ambient temperature. A rag soaked in a 50% alcohol/water solution may be wrapped around the strands and sleeve to prevent oxidation and the stainless steel pins may now be removed (123). Again, to facilitate cooling, air may be blown through the stator bar from the opposite end. After completion of the above steps, the sleeve is successfully brazed to the strands in an electrically conductive, mechanically rigid and fluid tight manner.

Figure 6:
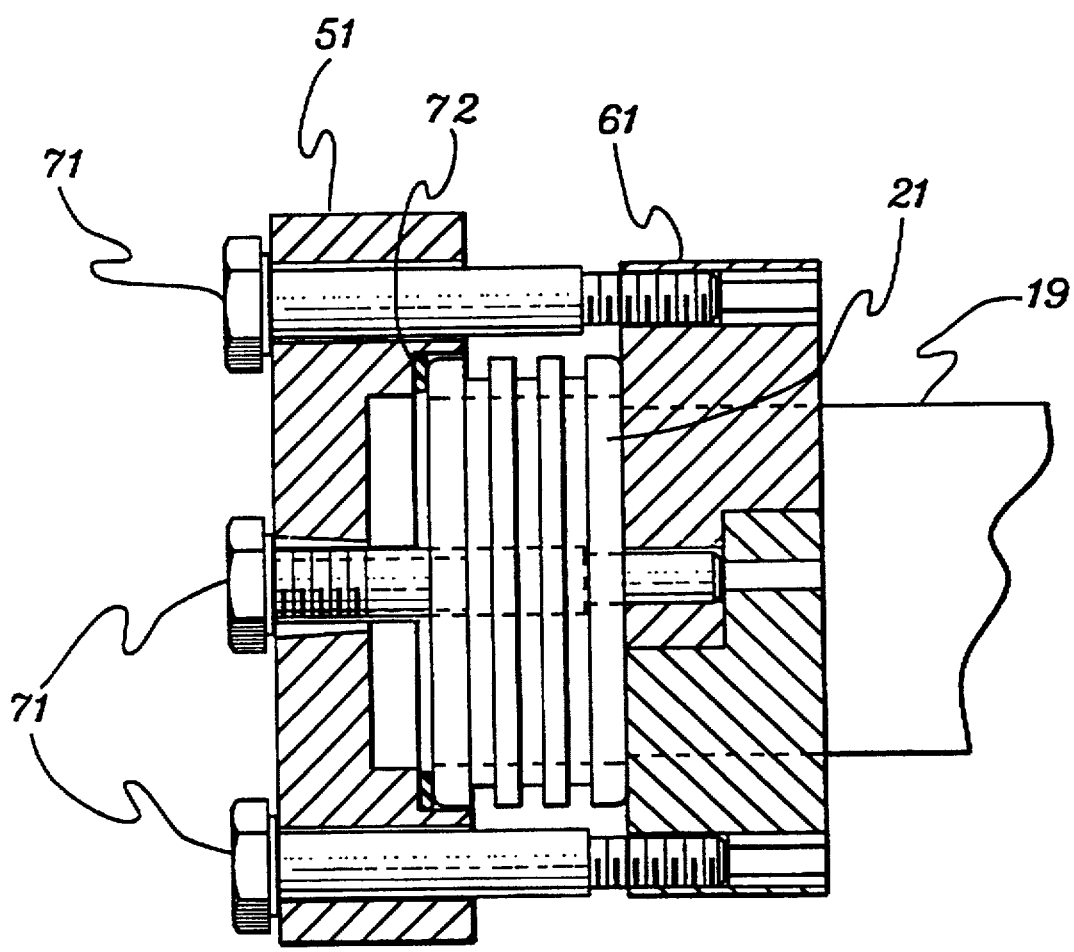
FIG. 6 is a cross-sectional view of a pressure test fixture that is affixed to a completed sleeve and stator bar assembly according to one embodiment of the present invention.

To verify the fluid tight integrity of the braze, a pressure test cap (FIG. 6) comprising a front cap 51 and a rear support 61 is attached to the sleeve 21 and stator bar 19 assembly. Specifically, the front cap 51 and rear support 61 are held together by bolts 71. The front of the sleeve/stator bar is sealed to the front cap 51 by an O-ring 72. A trace gas pressure test (FIG. 9—125) is then performed of which the individual steps will be apparent to one of ordinary skill in the art. If leaks are detected, the induction brazing station is reattached and the braze is repeated. Once no leaks are detected following brazing, the sleeve is cleaned in preparation for brazing of the clip thereto. Cleaning may be performed by, for example, using Scotchbrite polishing wheels as discussed hereinabove.

Figure 8:
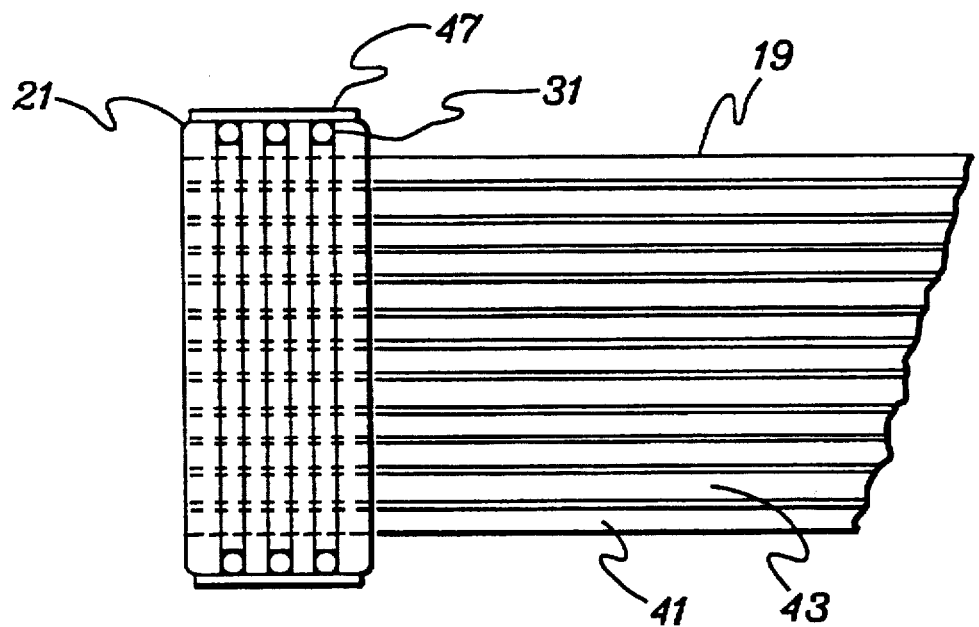

A further step (127) in preparing the sleeve for brazing to the clip includes fitting round brazing alloy 45 (FIG. 8) into the grooves 31 of the sleeve 21 (the sleeve with grooves, e.g., FIG. 4). This round brazing alloy 45 helps form a tight fit between the sleeve 21 and the clip and provides a large amount of brazing alloy therebetween to facilitate a strong brazed connection to extensive areas on both the sleeve and clip. Further, ribbon brazing alloy 47 is preferably wrapped around the outside of sleeve 21 (FIGS. 7 and 8 and is similarly wrapped around the outside of the tapered sleeve 151 of, for example, FIG. 10). Additionally, ribbon brazing alloy is shaped into L shaped pieces and fit into the clip using flux as a temporary holder. Thus, an adequate amount of brazing alloy is provided in all contact areas between the clip and sleeve such that a strong, fluid-tight brazed connection is facilitated.

The brazing alloy used to connect the clip to the sleeve has a lower melting temperature than the brazing alloy used to connect the sleeve to the strands. A lower temperature alloy (sometimes referred to herein as a "member" brazing alloy) is used so that the clip can be brazed to the sleeve without disturbing the existing braze from the sleeve to the strands. As one example, an AWS BAG 7 designation alloy may be used to connect the sleeve to the clip. This brazing alloy has a melting temperature of approximately 800 degrees Fahrenheit, while the brazing alloy used to connect the sleeve to the strands was, for example, an AWS B-CUP 5 brazing alloy with a melting temperature of approximately 1400 degrees Fahrenheit.

Continuing with the process, prior to brazing, the sleeve is placed over the clip. Since the sleeve and clip were machined to have a precise fit, the addition of brazing alloy around the sleeve and within the clip may make matable engagement thereof difficult. To facilitate an easy fit, the clip may be slightly heated (approximately 200 degrees Fahrenheit) so that it expands. Thereafter, the clip is placed over the sleeve and is allowed to cool such that it contracts and fits tightly over the sleeve (FIG. 9B—129). This heating/expansion process may not be necessary for the tapered sleeve 151 of, for example, FIG. 10 because of the tapered nature of the clip/sleeve connection.

The induction brazing station is fitted with coils that conformally surround the clip, and the station is checked for cooling water leaks. The chill blocks are set in place on the stator bar and are also tested for cooling water leaks. After all checks have been completed, the chill blocks and the induction brazing station are activated (131), and the heat is raised to the melting point of the BAG 7 brazing alloy (approximately 900–1100 degrees Fahrenheit). During brazing, additional BAG 7 brazing alloy may be added to the back side of the clip where it meets the sleeve as necessary. When brazing the tapered sleeve, pressure may be continuously applied to the clip thus forcing the clip and sleeve tightly together forming a strong and fluid tight brazed connection. After the brazed connection is complete, the induction heater is removed, and a rag soaked with water/alcohol solution is again used, this time to cover the clip.

The assembly may then be tested for leakage by attaching an air hose (133) to the fluid port of the clip and applying pressure while monitoring for leaks (135). If leaks exist, the brazing station is reattached and the brazing process repeated. Once a fluid tight assembly is formed, the copper leaves (and/or copper piping) are attached to the new clip (137) along with the water hose by a torch brazing procedure such that both the separate electrical and the separate fluidic connections to the connector are established. As final steps, the tape based insulation is reapplied to the end of the stator bar and the new two-piece connector. The bulk insulation is then replaced along with any other generator parts removed during the repair process. With this, the replacement of the defective connector is completed.

As a note, if multiple defective connectors are being replaced at the same time, then the final leak test may be performed on all of the new connectors at once. This could save considerable time depending on how many defective connectors are being replaced with the two-piece connector of the present invention.

If any of the new two-piece connectors fail, then replacement thereof is facilitated by a method opposite to that of the installation procedure described above. To summarize, first the copper leaves (and/or copper piping) and water hose are disconnected from the connector. Assuming a complete replacement is needed, the clip portion of the connector is then heated to the melting point of the clip to sleeve brazing alloy and the clip is removed. The sleeve is then heated (with pins inserted) and it is removed from the strands. The assembly process then moves forward as described hereinabove such that replacement is achieved. Of course, if a leak can be cured at any intermediate stage of disassembly by simply rebrazing, then further disassembly is not required.

As a further note, the two-piece connector of the present invention may be used in the initial fabrication of generators. Due to the higher quality brazed connections between the stator bar and the new two-piece connector, as well as the high quality connections between the clip and sleeve of the connector itself, the connector of the present invention will initially form a more fluid-tight connection such that less frequent repair should be necessary. However, if repair does become necessary, such repair is readily performed as disclosed hereinabove.

To briefly summarize, the techniques of the present invention have numerous advantages and features attributable thereto. Specifically, the techniques disclosed herein facilitate the replacement of a defective electrical and fluidic connector attached to a stator bar while the stator bar is still within the electric generator. This advancement results in a cost savings as a conventional connector repair process requires the stator bars to be physically removed from the generator. This type of repair process is expensive compared to an "in machine" repair. In fact, some electric generator manufacturers recommend a full rebuild of a generator when connectors require replacing. Such a replacement has an excessively high cost associated with it. As a further advantage, the connector of the present invention provides a more fluid tight connection. Moreover, repair of the connector is easily facilitated using the techniques disclosed herein. Thus, the techniques of the present invention improve the reliability of, and repair process associated with, the electrical and fluidic connectors that terminate water cooled stator bars in large electric machines.

While the invention has been described in detail herein, in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. An electrical and fluidic connector for connecting an electro-fluidic conductor to a fluidic conductor and an electrical conductor, said electrical and fluidic connector comprising:

a first member that is formed of an electrically conductive material and is configured to encircle and thereby electrically attach to an end portion of said electro-fluidic conductor;

a second member that is formed of an electrically conductive material and is configured for engagement to said first member, said second member including a fluid port for coupling to said fluidic conductor and said second member being electrically couplable to said electrical conductor; and wherein said first member and said second member define a hollow inner chamber when said first member and said second member are in engagement, said hollow inner chamber comprising a fluid tight chamber such that fluid is passed between said electro-fluidic conductor and said fluid port of said second member, said fluid passing through said hollow inner chamber, and wherein said first member and said second member provide electrical coupling between said electro-fluidic conductor and said electrical conductor when said second member is electrically coupled to said electrical conductor.

2. The electrical and fluidic connector of claim 1, wherein said electrical and fluidic connector and said electro-fluidic conductor are within a liquid cooled electric machine, and wherein said electro-fluidic conductor comprises a stator bar, said first member being configured to encircle and thereby electrically attach to an end portion of said stator bar.

3. The electrical and fluidic connector of claim 2, wherein said stator bar includes a plurality of electrically conducting strands, at least one electrically conducting strand of said plurality of electrically conducting strands being adapted to conduct fluid, and wherein said first member is configured to encircle and electrically attach to an end portion of said plurality of electrically conducting strands.

4. The electrical and fluidic connector of claim 2, wherein said first member and said second member are each fabricated of machined copper such that said first member and said second member have a lower porosity than a porosity of cast copper.

5. In a liquid cooled electric machine having a plurality of stator bars, wherein a first stator bar is coupled to a second stator bar, said first stator bar and said second stator bar each having a plurality of electrical and fluidic conductive strands extending therethrough, and wherein an electrical and fluidic connector is employed in coupling said first stator bar and said second stator bar, said electrical and fluidic connector comprising:

an electrically conductive first member configured to encircle and thereby electrically attach to an end of said plurality of electrical and fluidic conductive strands of said first stator bar;

an electrically conductive second member configured for engagement to said first member, said second member being electrically couplable to said plurality of electrical and fluidic conductive strands of said second stator bar, said second member further including a fluid port; and wherein said first member and said second member define a hollow inner chamber when said first member and said second member are in engagement, said hollow inner chamber comprising a fluid tight chamber such that fluid is passed between said plurality of electrical and fluidic conductive strands of said first stator bar and said fluid port of said second member, said fluid passing through said hollow inner chamber, and when said first member and said second member are in engagement electrical connection of said plurality of electrical and fluidic conductive strands of said first stator bar to said plurality of electrical and fluidic conductive strands of said second stator bar can be achieved.

6. The electrical and fluidic connector of claim 5, wherein said first member and said second member each comprise machined copper.

7. The electrical and fluidic connector of claim 5, further comprising a strand brazing alloy for securing said first member to said electrical and fluidic conductive strands.

8. The electrical and fluidic connector of claim 7, further comprising a member brazing alloy for securing said second member to said first member in a fluid tight manner.

9. The electrical and fluidic connector of claim 8, wherein said strand brazing alloy has a first melting temperature and said member brazing alloy has a second melting temperature, said first melting temperature being higher than said second melting temperature to facilitate brazing of said second member to said first member without melting said strand brazing alloy.

10. The electrical and fluidic connector of claim 5, wherein said first member comprises a sleeve that is configured to encircle and attach to the end of said plurality of electrical and fluidic conductive strands of said first stator bar.

11. A repair method for providing an electrical and fluidic connector on an electro-fluidic conductor, said electrical and fluidic connector having a first member and a second member that are separate and both electrically conductive, said second member having a fluid port for coupling to a fluid conductor and said second member being electrically conductive for electrical coupling to an electrical conductor, said repair method comprising the steps of:

(a) removing an existing electrical and fluidic connector from said electro-fluidic conductor;

(b) securing said first member to said electro-fluidic conductor such that said first member encircles an end portion of said electro-fluidic conductor and forms a fluid tight seal thereto, and electrically connects therewith; and (c) securing said second member to said first member such that said first member and said second member define a hollow inner chamber that comprises a fluid tight chamber for passing fluid between said electro-fluidic conductor and said fluid port of said second member, and wherein said first member and said second member electrically couple said electro-fluidic conductor to said electrical conductor when said electrical conductor is electrically coupled to said second member.

12. The repair method of claim 11, wherein said removing (a) comprises heating said existing electrical and fluidic connector to soften an existing brazing alloy securing said existing electrical and fluidic connector to said electro-fluidic conductor such that said removing step is facilitated.

13. The repair method of claim 11, further comprising cleaning the end portion of the said electro-fluidic conductor subsequent to said removing step (a) and prior to said securing step (b).

14. The repair method of claim 11, further comprising verifying said fluid tight seal of said securing step (b) prior to said securing step (c).

15. The repair method of claim 14, wherein said verifying includes affixing a test cap to said first member and pressurizing said electro-fluidic conductor such that any leaks between said first member and said electro-fluidic conductor are detected.

16. The repair method of claim 11, wherein said securing step (b) comprises brazing said first member to said electro-fluidic conductor using a first brazing alloy, and wherein said securing step (c) comprises brazing said second member to said first member using a second brazing alloy, said second brazing alloy having a lower melting temperature than a melting temperature of said first brazing alloy.

17. The repair method of claim 16, wherein said securing step (c) includes heating said first member and said second member to a temperature at least as high as the melting temperature of the second brazing alloy but lower than the melting temperature of the first brazing alloy, wherein the first brazing alloy does not melt during said securing step (c).

18. The repair method of claim 11, further comprising coupling the electrical conductor and the fluidic conductor to said electrical and fluidic connector subsequent to said securing (c).

19. The repair method of claim 11, wherein said removing step (a) comprises removing any insulation over said existing electrical and fluidic connector prior to removing of said existing electrical and fluidic connector.

20. The repair method of claim 11, wherein said electro-fluidic conductor comprises a stator bar in a liquid cooled electric machine, and wherein said securing steps (b) & (c) are performed while said stator bar is installed in said liquid cooled electric machine.

21. The repair method of claim 20, further comprising insulating the electrical and fluidic connector subsequent to said securing step (c).

22. The repair method of claim 21, further comprising prior to said insulating, performing a pressure test on said stator bar and said electrical and fluidic connector.

\* \* \* \* \*